United States Patent
Musman

(10) Patent No.: US 7,469,239 B2
(45) Date of Patent: Dec. 23, 2008

(54) SYSTEM AND METHOD FOR USING AGENT-BASED DISTRIBUTED REASONING TO MANAGE A COMPUTER NETWORK

(76) Inventor: Scott A. Musman, 7800 Hayfield Rd., Alexandria, VA (US) 22315

( * ) Notice: Subject to any disclaimer, the term of this patent is extended or adjusted under 35 U.S.C. 154(b) by 165 days.

(21) Appl. No.: 11/156,471

(22) Filed: Jun. 21, 2005

(65) Prior Publication Data

US 2006/0036670 A1    Feb. 16, 2006

Related U.S. Application Data

(60) Provisional application No. 60/580,722, filed on Jun. 21, 2004.

(51) Int. Cl.
*G06N 5/00* (2006.01)
(52) U.S. Cl. .......................... 706/46; 706/45
(58) Field of Classification Search ............... 706/46, 706/45, 12; 704/9; 370/342; 89/1.11
See application file for complete search history.

(56) References Cited

U.S. PATENT DOCUMENTS

| | | | |
|---|---|---|---|
| 5,504,837 A | | 4/1996 | Griffeth et al. |
| 5,586,218 A | * | 12/1996 | Allen .......................... 706/12 |
| 5,673,265 A | * | 9/1997 | Gupta et al. ................ 370/432 |
| 5,715,468 A | * | 2/1998 | Budzinski ..................... 704/9 |
| 5,805,775 A | | 9/1998 | Eberman et al. |
| 5,968,176 A | | 10/1999 | Nessett et al. |
| 6,012,152 A | | 1/2000 | Doulk et al. |
| 6,144,989 A | | 11/2000 | Hodjat et al. |
| 6,212,528 B1 | | 4/2001 | Brophy et al. |
| 6,226,273 B1 | | 5/2001 | Busuioc et al. |
| 6,249,755 B1 | | 6/2001 | Yemini et al. |
| 6,260,059 B1 | | 7/2001 | Ueno et al. |
| 6,421,719 B1 | | 7/2002 | Lewis et al. |
| 6,430,712 B2 | | 8/2002 | Lewis |
| 6,493,697 B1 | | 12/2002 | Stier et al. |
| 7,047,861 B2 | * | 5/2006 | Solomon .................... 89/1.11 |
| 2002/0055903 A1 | | 5/2002 | Solomon |
| 2002/0123983 A1 | | 9/2002 | Riley et al. |
| 2002/0133721 A1 | | 9/2002 | Adjaote |

* cited by examiner

*Primary Examiner*—Wilbert L Starks, Jr.
(74) *Attorney, Agent, or Firm*—David Kiewit

(57) ABSTRACT

The present invention describes a system and method for using agent-based distributed reasoning to manage a computer network. In particular, the system includes interface agents to integrate event streams, distributed reasoning agents, and response agents, which run on hosts in the network. An interface agent monitors a resource in the network and reports an event to an appropriate distributed reasoning agent. The distributed reasoning agent, using one or more knowledge bases, determines a response to the event. An appropriate response agent implements the response. Characteristics of the reasoning agent's mean that they can work together collaboratively, as well as implementing parallel algorithms.

17 Claims, 12 Drawing Sheets

| Edit | Save | | Help |
|---|---|---|---|
| Case Name | Passwd file | Responses | |
| Documentation | Someone taking password file | Add-Knowledge $local | |
| Platforms | All | | |
| Specific | 9 | | |
| Priority | 10 | ... | |
| ● Active | ○ Always Fire | ● Call Next | ○ Timeout: Never |

Case contents

| Knowledge | System-Monitored remote-host | Compare: | No-knowledge | ▶ |
|---|---|---|---|---|
| TimeFrame | | Compare: | None | ▶ |
| Time | | Compare: | None | ▶ |
| Remote-Host | | Compare: | None | ▶ |
| File-Size | | Compare: | None | ▶ |
| File | /passwd | Compare: | Substring | ▶ |
| Transfer-Type | | Compare: | None | ▶ |
| ... | ... | | | |

FIG. 7

SYSTEM AND METHOD FOR USING AGENT-BASED DISTRIBUTED REASONING TO MANAGE A COMPUTER NETWORK

FIELD OF THE INVENTION

The present invention relates to systems and methods for using agent-based distributed reasoning to manage computer networks. In particular, the present invention relates to systems and methods that use agents and distributed reasoning to detect a situation occurring within a computer network by analyzing events, determining whether they relate to situations that require automated response, and automatically responding to the event based on the analysis. As such, the present invention provides improved functionality over a system described in the inventor's earlier U.S. Pat. No. 7,127,441, issued on Oct. 24, 2006, the disclosure of which is herein incorporated by reference.

BACKGROUND OF THE INVENTION

In the following discussion certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Recent cyber-attacks on major corporate and government computer networks and World Wide Web ("WWW") sites continue to prove that the Internet is vulnerable to a wide variety of attacks. Such attacks cost organizations resources, time and money. Today there are many tools and operating system-specific features ("OS features") to manage computer networks and/or secure computer networks from various types of cyber-attacks.

These tools, however, suffer from many shortcomings. Among these shortcomings, a lack of interoperability has limited effectiveness of a network management scheme based on these tools. Typically, to effectively manage and protect a network, a variety of tools and OS features need to be used together. However, because they are typically designed to operate independently of each other, they are neither interoperable nor capable of cooperating with each other. This lack of interoperability results in important system and security information being placed in numerous locations within a computer network, placing an undue burden on network administrators, who are forced to monitor a variety of data and reports. Further, the lack of interoperability increases a risk of overlooking important situations. Detection of a situation often requires synthesizing events from a variety of resources, and detecting patterns in those events. Since there is currently no effective tool to do such tasks, it falls upon network administrators, further increasing a burden on them and increasing a risk of overlooking events that indicate time critical situations.

Other limitations of existing network management tools and OS features include: (1) they work from a centralized location within a network; and (2) they may not be compatible with one another. The use of centralized monitoring means that often only summary information of distributed events is used, and means that any distributed host that is cut-off from the central server becomes unprotected. These limitations further increase a burden on network administrators by necessitating configuration of multiple machines within a network and by increasing an amount of data and reports that need to be analyzed to detect an event.

Given the above-stated shortcomings and limitations of existing network management and security tools, there has been an increased interest in developing a mechanism that links a variety of network management and security tools to event-response functions and that allows multiple tools to be used together in a coordinated fashion. In other words, there is a need for a system and a method that ease network management tasks by allowing once disparate tools to communicate with one another and automatically provide an effective response to a variety of events, including internal and external security threats, through the use of artificial intelligence.

A characteristic of existing techniques is that they typically process and correlate events in a single place. This tends to lead to the use of dedicated appliances to handle the processing load. The alternative approach used in this invention is to distribute the processing among many machines. Although parallel processing and distributed algorithms are sometimes used in the scientific programming community, they have not routinely been applied in computer and network management.

A characteristic of agent-based computing is that there are many asynchronous agents running simultaneously throughout a computing network. One way to coordinate them is for them to exchange messages. Using this message passing mechanism it becomes possible to allow them to maintain a common knowledge-base. This ability to share knowledge and memory yet process independently enables the development of parallel programs and algorithms that are independently much more efficient in terms of memory usage, cpu usage, and network utilization than they would be if they were implemented as a single monolithic program that gathered and processed all of the same data by sending it over the network.

SUMMARY OF THE INVENTION

The present invention provides systems and methods for using agent-based distributed reasoning to manage a computer network. In particular, the present invention combines an agent framework and distributed reasoning with available management or security tools to provide automatic, adaptive response capability and distributed, decentralized, yet coordinated decision-making capability, to enable effective and efficient management of computer networks.

To achieve these and other advantages and in accordance with the purposes of the present invention, as embodied and broadly described herein, the invention includes an agent-based distributed reasoning system for managing a computer network. The system includes interface agents that run on hosts in the computer network. The interface agents are assigned to resources within the computer network, and allow the resource events to be encapsulated and transferred to other agents. The system also includes distributed reasoning agents and response agents, both of which run on the hosts. In the system, an interface agent sends an input regarding a resource event to an appropriate distributed reasoning agent. The appropriate distributed reasoning agent, upon receiving the input, accesses one or more knowledge bases to determine if the event warrants a response, then selects a response and sends a response directive to an appropriate response agent. The appropriate response agent implements the response to resolve the event. The distributed reasoning agent recognizes important situations using rules or cases (as in case-based reasoning) and even probabilistic reasoning to relate events to situations that require response, where the situations may consist of one or more events.

Additionally, though not necessary for the invention to be useful, the distributed reasoning agents can share their working memory of knowledge and work together collaboratively. By sharing their working memory it is possible to implement parallel and distributed algorithms that are more efficient and fault tolerant than centralized versions of the same algorithms. The use of centralized processing and reasoning is not precluded from an instance of our system, but is used only when it is desired, or considered to be a useful implementation option, rather than as the only possible choice. Additionally, even when reasoning agents do not share their working memory, it is possible for one reasoning agent to query another reasoning agent for their knowledge objects to determine if they may have experienced events related to local activity.

In another aspect, the invention includes a method for managing a computer network. The computer network has agent-based framework and agents. The agents include interface agents, distributed reasoning agents, and response agents. The method includes monitoring a resource in the computer network using an interface agent and reporting, using the interface agent, an event in the resource to an appropriate distributed reasoning agent. The method further includes selecting a response using the appropriate distributed reasoning agent and implementing the response using an appropriate response agent. The appropriate distributed reasoning agent accesses one or more knowledge bases to select a response.

As part of managing the computer networks, the present invention attempts to make this process as easy as possible for the user of the invention. In a typical installation, many components and component configurations are duplicated within a computer network either because they consist of the same hardware and software, or because they are used for similar function within the network (i.e. user workstations in an accounting department). To ease management of these "like" components, the system of the present invention allows them to be grouped together, and managed as a single entity. The grouping mechanism of the present invention is extremely flexible in which components can be added to groups based on type or function. This grouping supports both "is-a" and "has-a" relationships.

In yet another aspect, the invention includes a system for managing a computer network with agent-based framework. The computer network has agents, including interface agents, distributed reasoning agents, and response agents. The system includes means for monitoring a resource in the computer network using an interface agent and means for reporting, using the interface agent, an event in the resource to an appropriate distributed reasoning agent. It also includes means for selecting a response using the appropriate distributed reasoning agent by accessing one or more knowledge bases and means for implementing the response using an appropriate response agent.

Finally, the invention includes a computer program product for managing a computer network. The computer network has agent-based framework with agents including interface agents, distributed reasoning agents, and response agents. The computer program product includes computer readable program code configured to: (1) monitor a resource in the computer network using an interface agent; (2) report, using an interface agent, an event in the resource to an appropriate distributed reasoning agent; (3) select a response using the appropriate distributed reasoning agent by accessing one or more knowledge bases; and (4) implement the response using an appropriate response agent. It also includes a computer readable medium in which the computer readable program codes are embodied.

Because the reasoning mechanism of the invention utilizes multiple reasoning agents that can be coupled together via the agent framework, it is possible for them to seamlessly share data structures that comprise their working memories. Appropriate portions of the agents' working memories can be kept synchronized using message passing mechanisms within the agent framework that are transparent to the user of the invention, and because of this it is possible for multiple reasoning agents to work together collaboratively implementing parallel distributed algorithms that correlate events that occur over multiple hosts. It may be noted that the terms 'synchronize', 'synchronizing' and the like are used in the sense established by Mills et al. in U.S. Pat. No. 7,139,748, the disclosure of which is herein incorporated by reference. These terms, as applied to a database, knowledge base or working memory generally describe a process by which a plurality of copies are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows updates ("mutations") e.g., additions, deletions and/or changes made to one copy of a database, for example a copy on a hand held computer, to be reflected to all copies.

Another feature of the invention is the use of a synchronized distributed working memory in the reasoning agents. The fact that reasoning can occur using a combination of both local events and summary information of remote events (via knowledge objects found in the knowledge base) allows the different types of distributed algorithms described below to be implemented, irrespective of whether the reasoning mechanism is rule-based, situational (i.e., CBR) or probabilistic via Bayesian Networks, or Utility models.

Additional features and advantages of the invention are set forth in the description which follows, are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 7 is a diagram showing one exemplary case structure that may be used in the present invention.

DETAILED DESCRIPTION OF THE PREFERRED EMBODIMENTS

Reference is now made in detail to the preferred embodiment of the present invention, examples of which are illustrated in the accompanying drawings.

Figure 1:
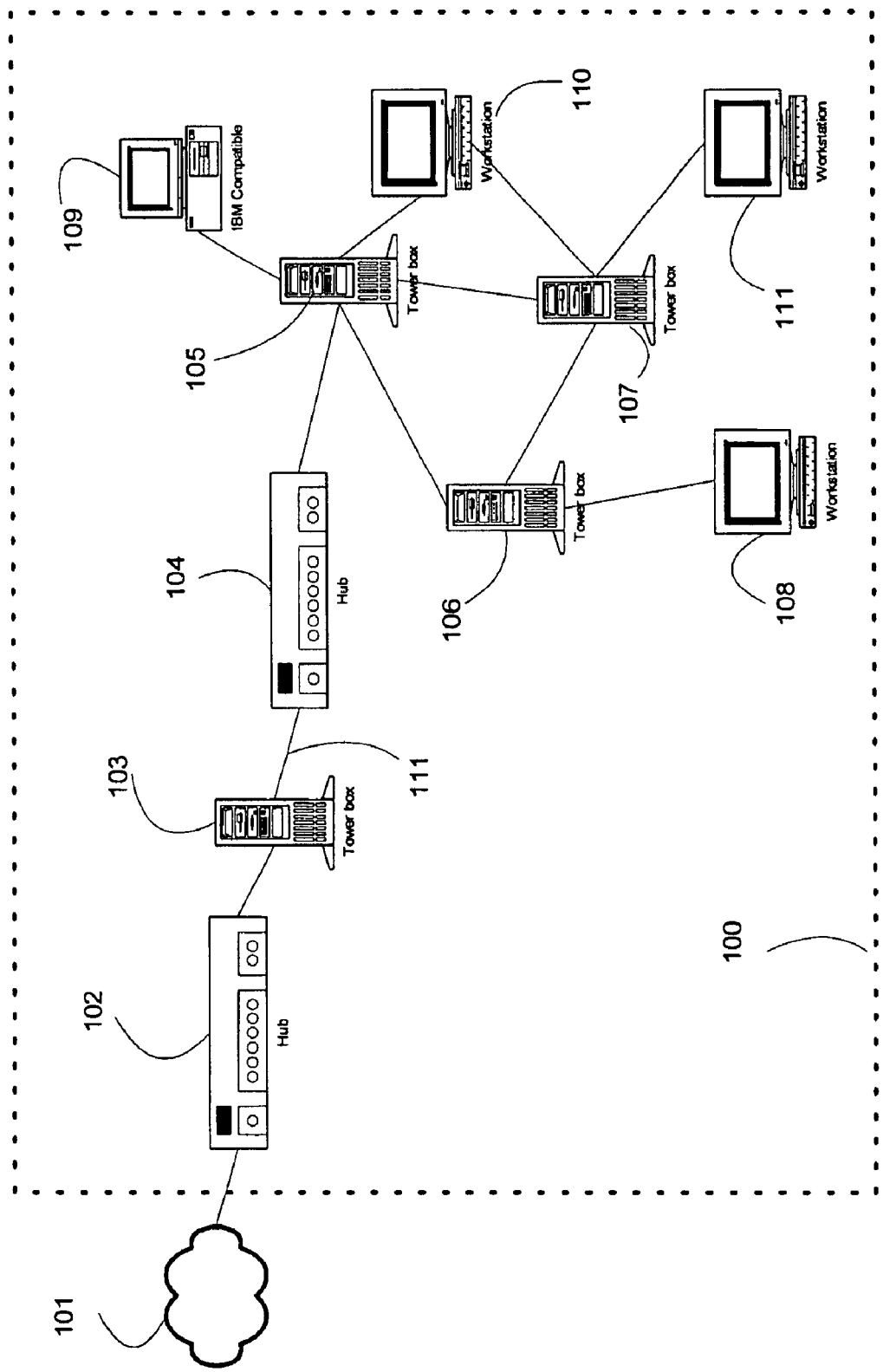
FIG. 1 is a block diagram depicting one example of a computer network, which may be managed by the present invention.

FIG. 1 depicts a computer network 100, which may be managed using the present invention. The computer network 100 is connected to the Internet 101. The computer network 100 includes routers 102 and 104, hosts 103, 105, 106, and 107, and desktop computers 108, 109, 110, and 111. A network 100 connects the routers, hosts, and desktop computers to each other. The hosts and desktop computers may run different operating systems, including, for example, UNIX, LINUX, and Microsoft Windows (NT, 2K, XP). In other words, the present invention is operating system and network framework independent and may be used to manage a wide variety of networks.

The computer network 100 may be managed by a variety of security tools, which may reside in one or more of the hosts. For example, the host 103 may have a firewall tool and the host 105 may include a web-server. The host 107 may serve as an access server and rely on its security tools, including its operating system features. In sum, as described in detail below, the present invention may be used to accommodate a variety of network management and/or security tools, and to provide means that allows various tools to cooperate and interoperate with each other.

The present invention may be built on top of an agent framework. Agents are programmable entities that can exchange messages, change state, and perform actions. Each agent is a separate entity that is able to interact with and reason about its own environment.

Agents typically operate independently. They each have their own view of the environment, in which they operate. In other words, two identical agents with an identical piece of information may react differently simply because they may have previously received different information and have different views about the state of the environment.

The use of an agent framework increases survivability of a network management system of the present invention. In agent frameworks, a function of a failing or failed agent may be reassigned to another agent. As such, a failure of one agent would have little or no effect on functions performed by a network management system of the present invention.

Agents may carry out conversations (via message passing) with other agents or perform local actions within their environment. Agents may exist in a local or remote execution environment (in an agent framework) whose purpose is to run agents by managing message passing and scheduling agents for execution. A directory service may be used to make message transmission work the same between sites as within sites.

Agents, when used in a distributed computer network environment, allow abstraction and categorization of network-management-related information that is reported on different log files on multiple machines within the network in a variety of formats. Abstraction allows the definition of a common messaging interface to perform the same operation, even though the underlying implementation mechanism used to perform the operation may be different from one component to another. An example would be using a single message format for blocking access to a corrupted service at the host, at a router, or at an external firewall. Categorization allows events that may essentially be the same but which are reported differently in different resources to be categorized and normalized so that they may be processed as a single event stream. One skilled in the art will appreciate that the above-stated features of agents enable a distributed, decentralized, and yet coordinated decision making.

The present invention may be built on top of publicly available agent framework, such as the Java Agent Template (lite) ("JATLite"), FIPA-OS, or JADE, which are Java-based tools intended to facilitate the development of agent-based systems. It may use a common coordination language, such as Knowledge Query and Manipulation Language ("KQML"), The FIPA agent communications language (FIPA-ACL), Coordination Language ("COOL"), Knowledge Interchange Format ("KIF"), Common Intrusion Detection Framework ("CIDF"), Extensible Markup Language ("XML"), and/or Intrusion Detection Message Exchange Format ("IDMEF").

Agents in the present invention may have one or more of the following characteristics. First, agents may be implemented in a distributed manner, allowing workload and computation to be distributed among many processes and machines. This distributed implementation of agents reduces an overhead incurred by a single process and increases the fault tolerance of a system. Second, agents may be implemented to allow functional abstraction, which allows directives to be issued from a functional perspective rather than having to be explicit about the implementation details of each directive to be accomplished. Third, agents may be implemented to facilitate tool integration. In other words, within agent framework, a series of separate tools may be integrated. A set of predefined messages can be defined for each tool, allowing them to be controlled either locally or remotely from a common interface. The tools can be operated together to fulfill some purpose larger than the capability of any one of the tools on its own.

Figure 2:
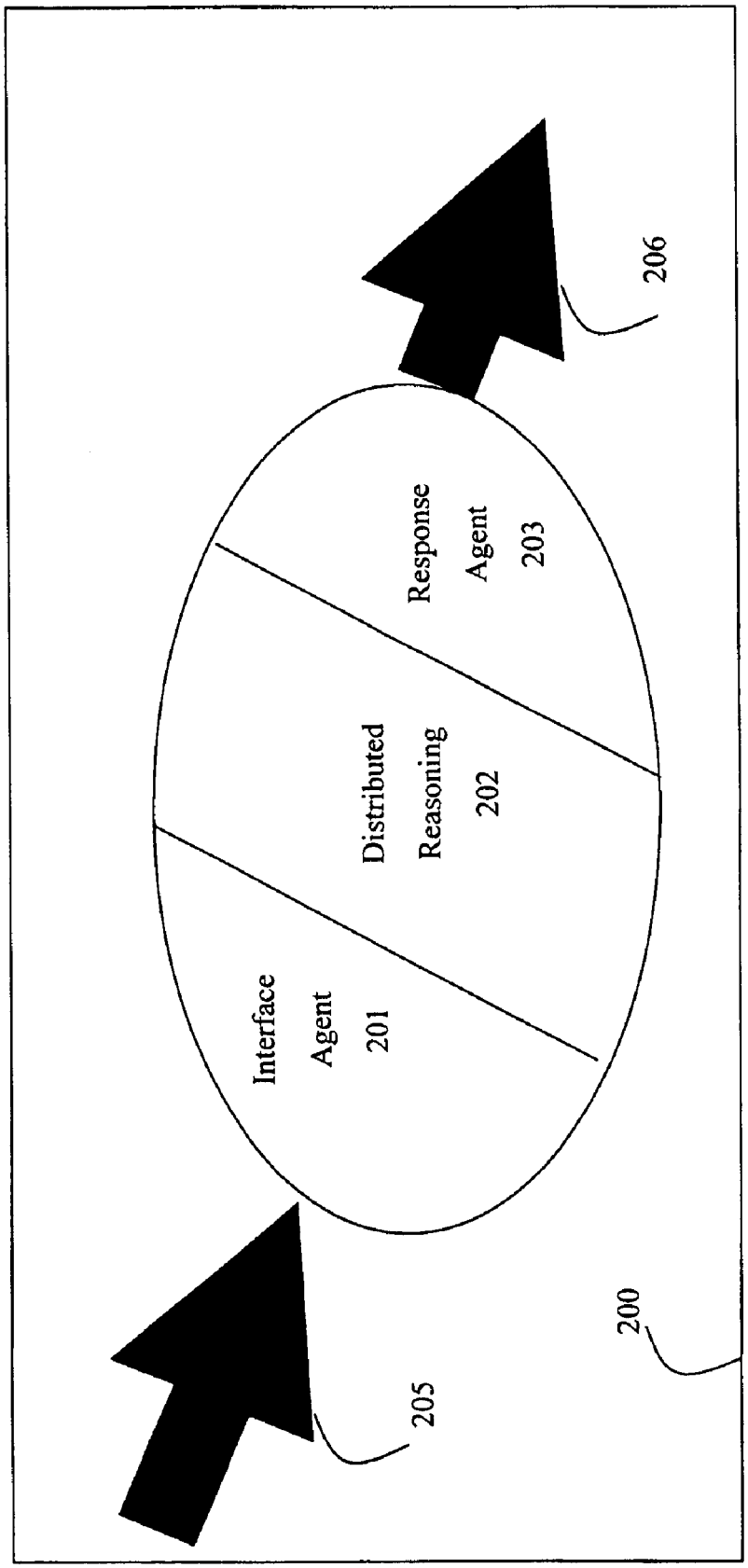
FIG. 2 is a block diagram showing one exemplary relationship between an interface agent, a distributed reasoning agent, and a response agent of the present invention.

Agents used in the present invention may be categorized based on a responsibility assigned to them. For example, the present invention includes interface agents, distributed reasoning agents, and response agents. FIG. 2 shows a logical view of one exemplary relationship among interface agents, distributed reasoning agents, and response agents. As described below, in FIG. 2, an interface agent 201 gathers information 205 to be processed by a distributed reasoning agent 202, which then uses a response agent 203 to implement appropriate actions, if any.

The interface agent 201, distributed reasoning agent 202, and response agent 203 run on a host 200 in a computer network that is managed by the present invention. The interface agent 201 processes information 205 received from an application, a security tool, or a machine, for which the interface agent 201 is responsible. The interface agent 201 sends an input to the distributed reasoning agent 202 for processing. The input from the interface agent 201 typically contains pertinent information within information 205. The distributed reasoning agent 202 then processes the input applying a reasoning mechanism, which is explained in detail below. In short, it finds one or more matching situations stored in a knowledge base, and chooses an appropriate response from the matching situations and sends information regarding the response to the response agent 203. The response agent 203, in turn, issue a response directive 206, which contains specific instructions to be executed within the host 200.

The present invention may use many types of agents, many of which fall into the categories listed previously. Examples of agents include input-filter agents, file-monitor agents, command-execution agents, command-file-execution agents, logging agents, email agents, and alert agents. Input-filter agents may monitor log files and execute routinely scheduled commands, and turn events that they produce into messages that are consumed by the reasoning agent. File-monitor agents may be assigned to monitor a specific file and generate a message to be sent to the reasoning agent using a regular expression from the log-file event contents. The message can be any format that is acceptable to the reasoning agent and can be consistent with standards such as XML, IDMEF, or KQML. Command-execution agents may periodically execute a command and parse an output of the command into one or more event messages to be sent to a reasoning agent. Command-file-execution agents may periodically execute a command that produces an output file and parse the output file contents into one or more event messages. Logging agents are an example of a response agent, that can append the message contents of a received message to a file specified at a configuration time. Email agents, given a list of recipients, a message template file, and some arguments, may substitute the arguments into a message template and send a message to the recipients. Finally, alert agents, upon receiving a message, popup a window on a screen displaying the contents of a message to alert users of important information.

In addition, the present invention may include agents that perform management functions related to operating the invention. This includes an agent for configuring the system, as well as a distributed system monitor agent and a status agent. The distributed system monitor agent allows the status of the agents to be ascertained, allows agents to be started and stopped, viewing of reasoning agents' knowledge bases, working memory, variables, and host log. The status agent, may monitor event matching activity over multiple hosts within a network. One skilled in the art will appreciate that the present invention allows many different types of agents besides those described above and is not limited by types of agents used.

Agents used in the present invention may collaborate with each other. One example of collaboration is now described.

A distributed agent function may be implemented as a set of agents that can track a user who is logged in to many machines within a single network. For instance, a user may use telnet or rlogin to log in to multiple machines.

Because distributed reasoning agents are found on multiple hosts, this invention makes it possible for them to work together collaboratively. In order to trace activity across multiple hosts, a reasoning agent may query an interface agent for additional information pertaining to some related event that the reasoning agent has just processed. The information can be local to the original triggering event, or remote to it. When a remote host is queried for information, the reasoning agent requesting information has the choice of maintaining control of the reasoning, or delegating the next phase to a different reasoning agent. By default the results of a remote query for information is returned to the requesting agent, but if desired, using a "reply-to" field, the requesting agent can redirect the reply to a query to another reasoning agent. Often, this would be the reasoning agent local to where the remote information resides. When this occurs, the original reasoning agent can often further prepare a remote reasoning agent to process the reply by passing a situation template to the remote reasoning agent so that it knows what to expect from the information returned by the query. This ability to query and follow a chain of related events across multiple hosts is believed to be a unique feature of the invention.

The agent functions may be installed on every machine in a network. When queried, they determine whether or not a login is valid and/or local, and invokes the assistance of agents on remote machines when necessary. This allows the agents to track the source of a login irrespectively of whether or not operating systems of machines are the same. On reaching the boundary of agent-enabled systems, an agent may perform more standard queries to the remote system, such as finger, that may provide information about the origin of a login.

Conversations or messages may cause an agent to implement different behaviors. Behaviors essentially can cause an agent to move from one state to another within a state diagram. When using an agent language, agent messages may be viewed as a state diagram and analyzed as a petri net for completeness, loops or errors.

Similarly, agent conversations may be programmed in an agent communications language such with KQML using JATLite, for example, or FIPA-ACL in JADE or FIPA-OS. One skilled in the art would recognize that the functionality of a JATLite implementation is the same as above, but the syntax of the program is different because JATLite uses KQML and Java, whereas ABS and COOL are implemented in Lisp. Other agent platforms can be used, or a custom infrastructure can provide the appropriate requirements.

Figure 4:
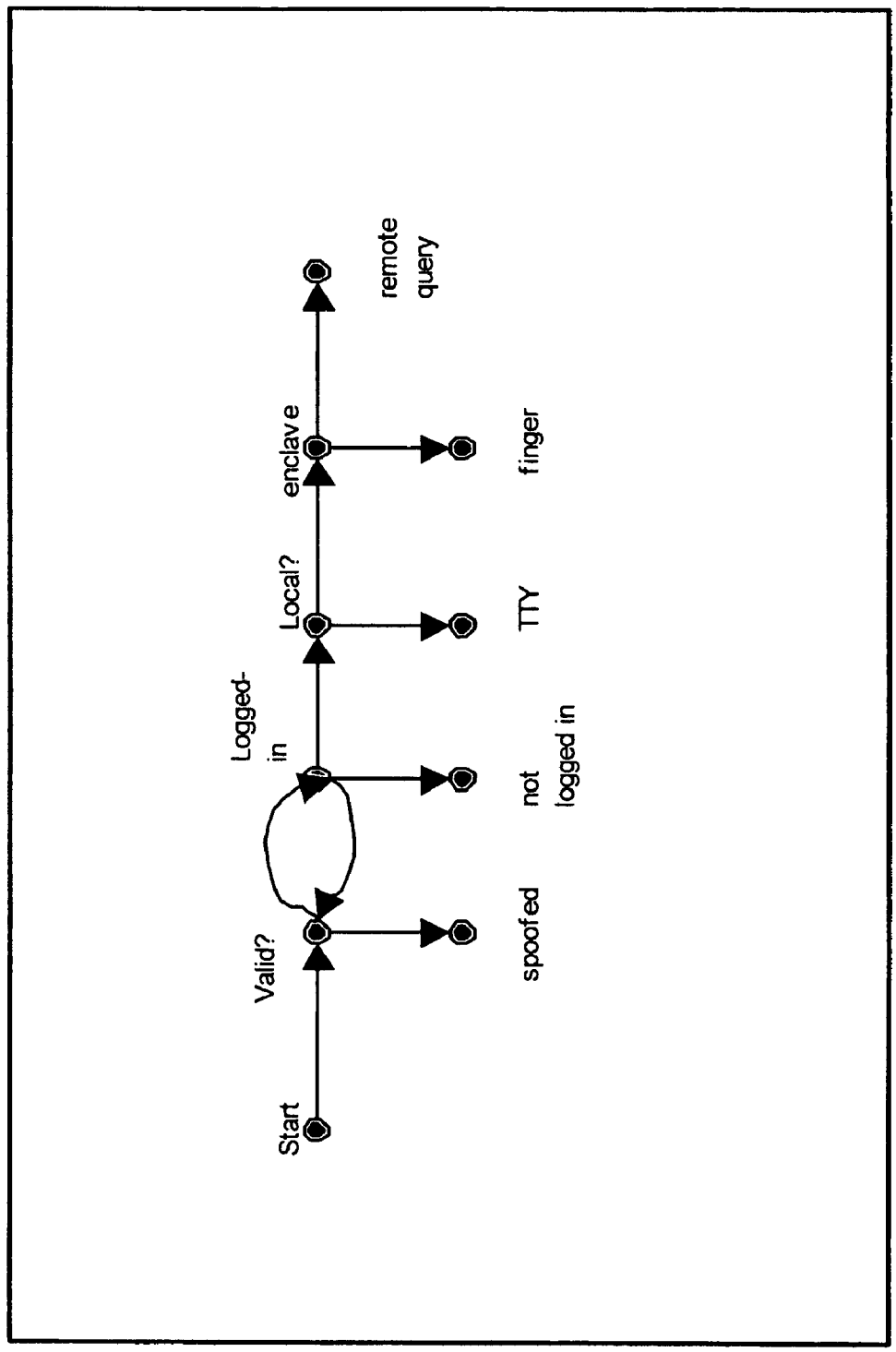
FIG. 4 is a block diagram showing one exemplary state transition of an agent in the context of a user-source-location conversation.

A state transition diagram in FIG. 4 shows one exemplary state transition of an agent in the context of a user-source-location conversation. Specifically, it describes one exemplary state transition of an agent that is invoked to determine if a user is logged into a machine by describing the agent's function in terms of primitive operations.

In FIG. 4, an agent first validates a user name. If it is invalid, it may return that the system may have been spoofed. If valid, it then confirms that the user is logged-in. If the user is logged-in, it determines if the login is from a local tty or from a network connection. The agent may repeat this operation as many times as necessary if the user is actually originated as someone else on the machine by using, for example, su username. If the login is local, the agent returns the local tty. If the login is remote, the agent determines if the remote machine is part of a protected enclave. If the remote machine is part of the protected enclave, an agent on the remote machine that performs a similar function is invoked. If the remote machine is not in the protected enclave, other information-gathering procedures are invoked to gather information about the remote machine and the user. The unix "finger" command is an example of something that might yield valuable information.

A characteristic of a reasoning agent in the current invention is that it is possible to use rules or situations to represent the states in the example, and use knowledge objects to help chain between the states. Predefined situations can be used to define the states, or situation templates (described in detail later) to add situations to the reasoning agents dynamically, so that the size of the memory used by the reasoning agents can be minimized and only grow when there are specific events that are likely to occur.

Figure 10:
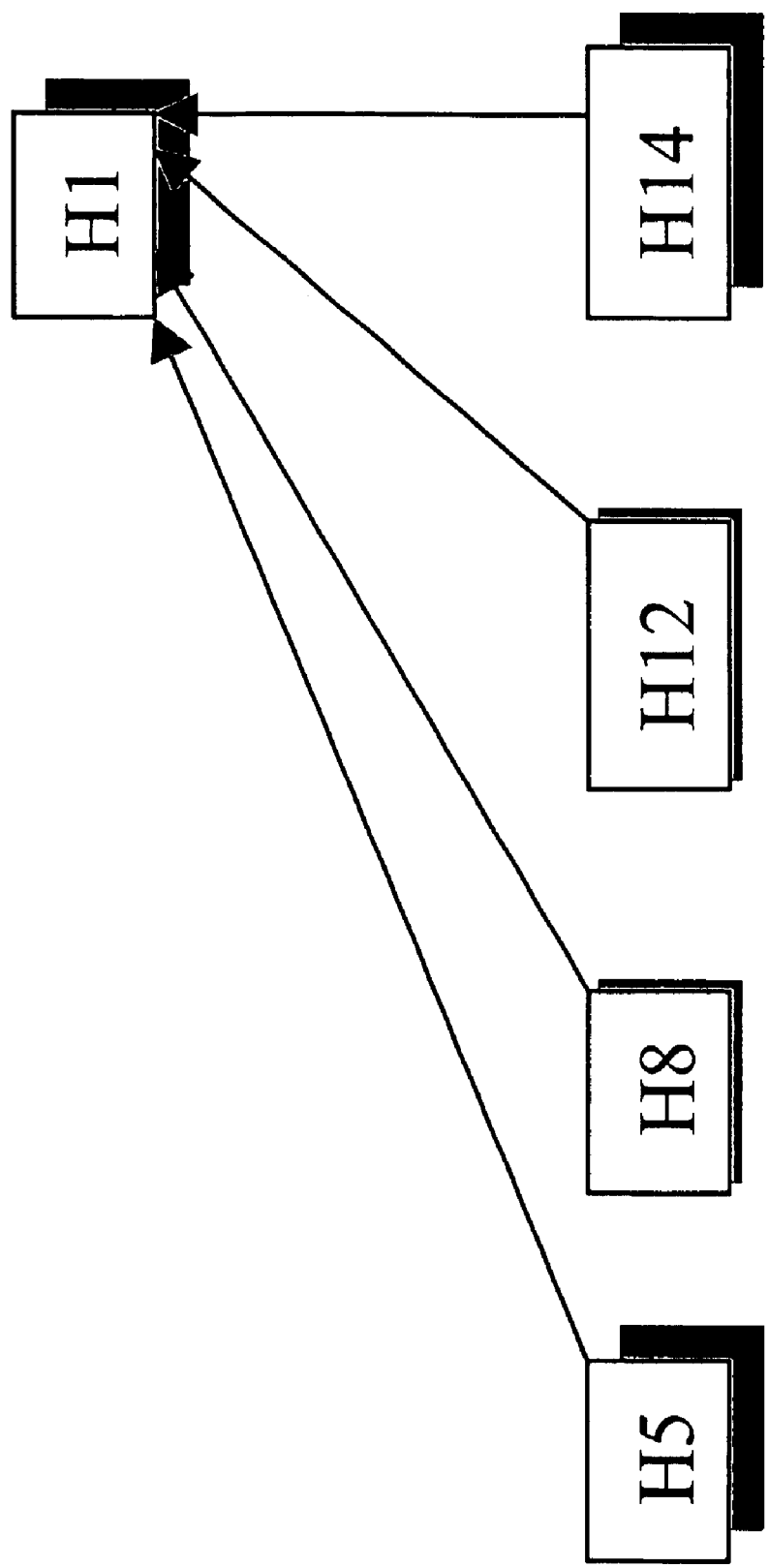
FIG. 10 illustrates example of a distributed algorithm that makes local decisions based on both local and remote information.
Figure 11:
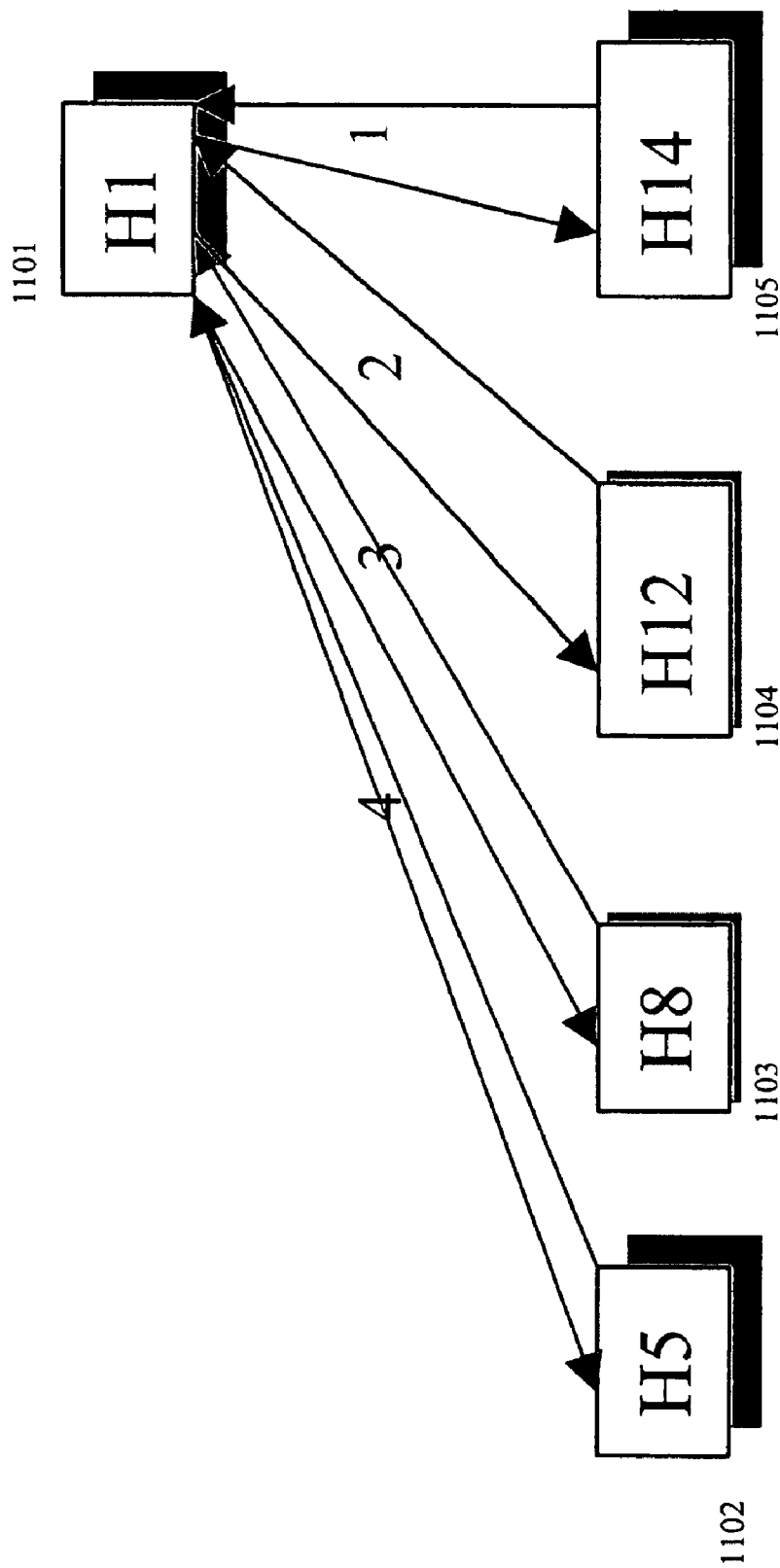
FIG. 11 illustrates example of a distributed algorithm that uses a reasoning agent at the location of some triggering event (situation) to facilitate traceback and information gathering related to the event using remote agents.

The implementation of the state-machine described in the example is the work-flow of an algorithm that can be implemented in a variety of different ways using the invention. In FIG. 10, updates to working memory from remote reasoning agents can combine with a local event observed at host H1 to trigger a response. In this situation it is a combination of both remote and local information that indicates a pattern of activity relevant to the host H1. Using the distributed agents it is possible to have a single reasoning agent be responsible for following a chain of evidence, by making queries to remote hosts using the agents within the agent-framework. In FIG. 11, Host H1 (1101), queries host H14 (1105) for remote information, which is returned to the reasoning agent on H1 (1101). In the example in the figure, the reply from H14 (1105) indicates that additional information can be found on host H12 (1104). H1 (1101) then queries host H12 (1104) for the additional information asking for a reply. In the example, the process continues further by having host H1 (1101) query host H8 (1103) and then H5 (1102), all the while retaining control of the decision making process.

Figure 12:
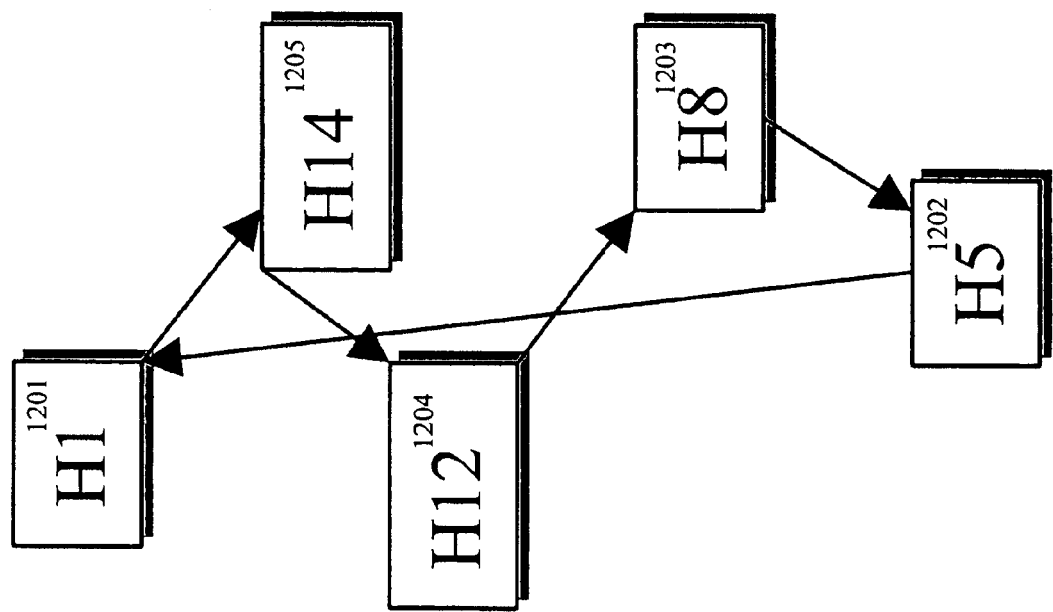
FIG. 12 illustrates example of a distributed algorithm that uses a reasoning agent at the location of some triggering event (situation) to facilitate traceback and information gathering related to the event using remote agents as well as remote reasoning agents. This example is different from FIG. 11 because the reasoning about the remote events is delegated to remote reasoning agents.

Alternatively, it would be possible to have the algorithm chain events over multiple reasoning agents. Using shared knowledge objects within the reasoning agents, and delegation capabilities it is possible to query remote agents for information, but to tell them (for example, using a "reply-to" directive in KQML or FIPA-ACL) to send their information to a different—possibly local to where the information is stored—reasoning agent (shown in FIG. 12). Both implementation approaches can accomplish the same result, but have different resource and fault tolerance characteristics. In FIG. 12 Host H1 (1201) queries host H14 (1205) for information related to an event found on H1 (1201) but asks the remote agent on H14 (1205) to send the reply to the query to the reasoning agent on host H14 (1205). In this example host H1 (1201) uses the case-templates to create new cases on the reasoning agent on host H14 (1205) to respond to the possible replies to the query. In this example, if the query for information requires additional information to be gathered from host H12 (1204), the process repeats, but this time from host H14 (1205) to host H12 (1204). The process continues until all of the information has been found on host H5 (1202), at which point, the process can complete, or (as in the example) the final result can be returned to host H1 (1201) that initiated the information gathering process. What differentiates the current invention from current practice is that the item that defines which Host is elected responsible for controlling the response actions and coordinating the other hosts is simply that the triggering event that identified the specific pattern occurred on the host. (H1 in FIGS. 10, 11, and 12). This embodiment of the invention makes it much more efficient and fault tolerant from current practice, in which the host(s) that look for patterns of distributed activity are designated ahead of time.

Figure 3:
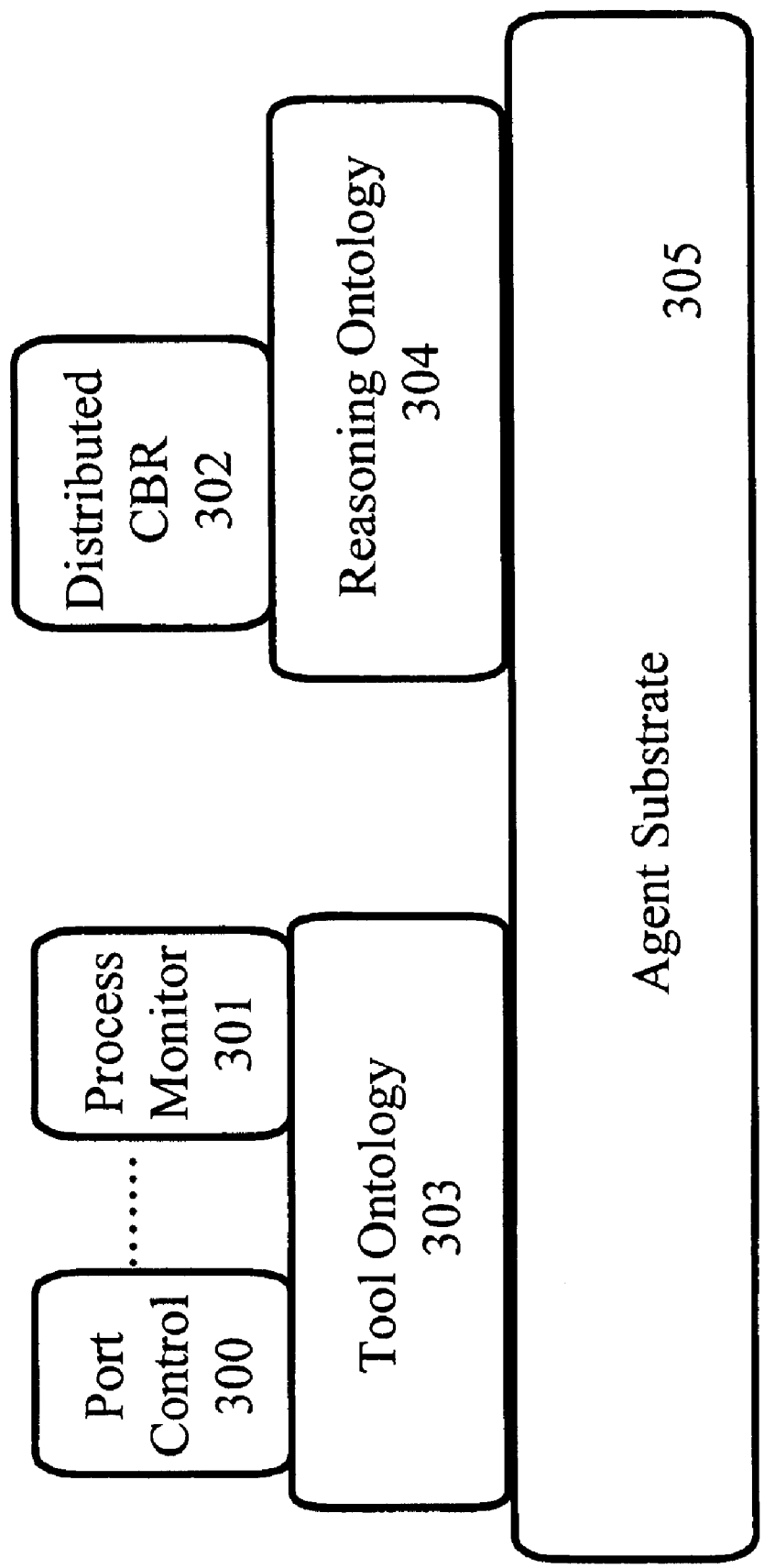
FIG. 3 is a representational diagram showing an exemplary layered topology of the present invention.

The present invention may be extended to support various tools and reasoning capabilities allowing an end-user to extend and build upon existing facilities. Specifically, the present invention may feature a layered topology such as one shown in FIG. 3. In FIG. 3, a tool ontology layer 303 and a reasoning ontology layer 304 reside on top of an agent substrate 305. For the tool ontology layer 303, one may have various tool-related layers such as a port control 300 and a process monitor 301. On top of the reasoning ontology layer 304, one may have a distributed case-based reasoner 302. Other reasoning capabilities may include Bayesian networks or a rule-based expert system, for example.

Figure 8:
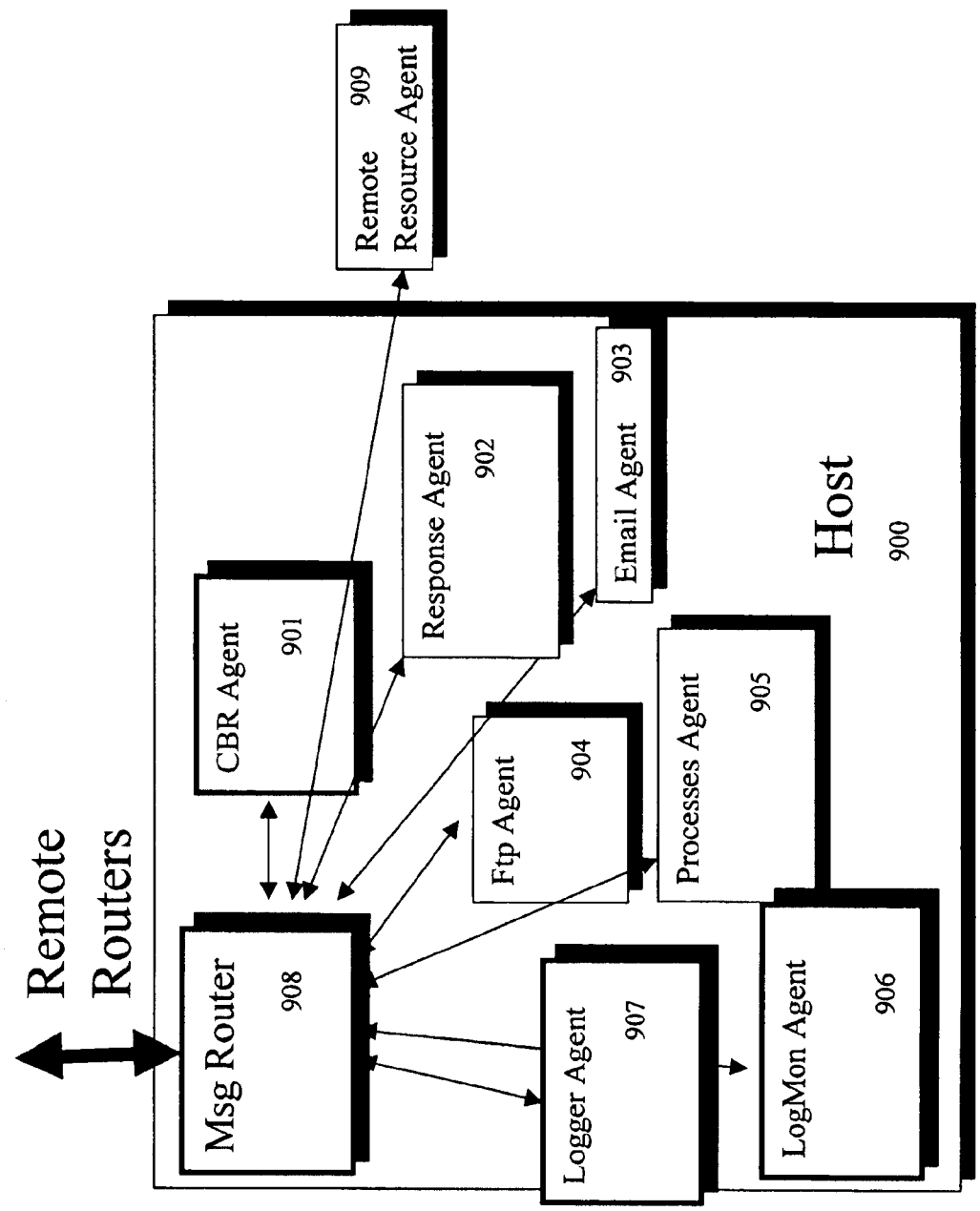
FIG. 8 is a simplified representational diagram showing one use of the present invention in a single-host environment.
Figure 9:
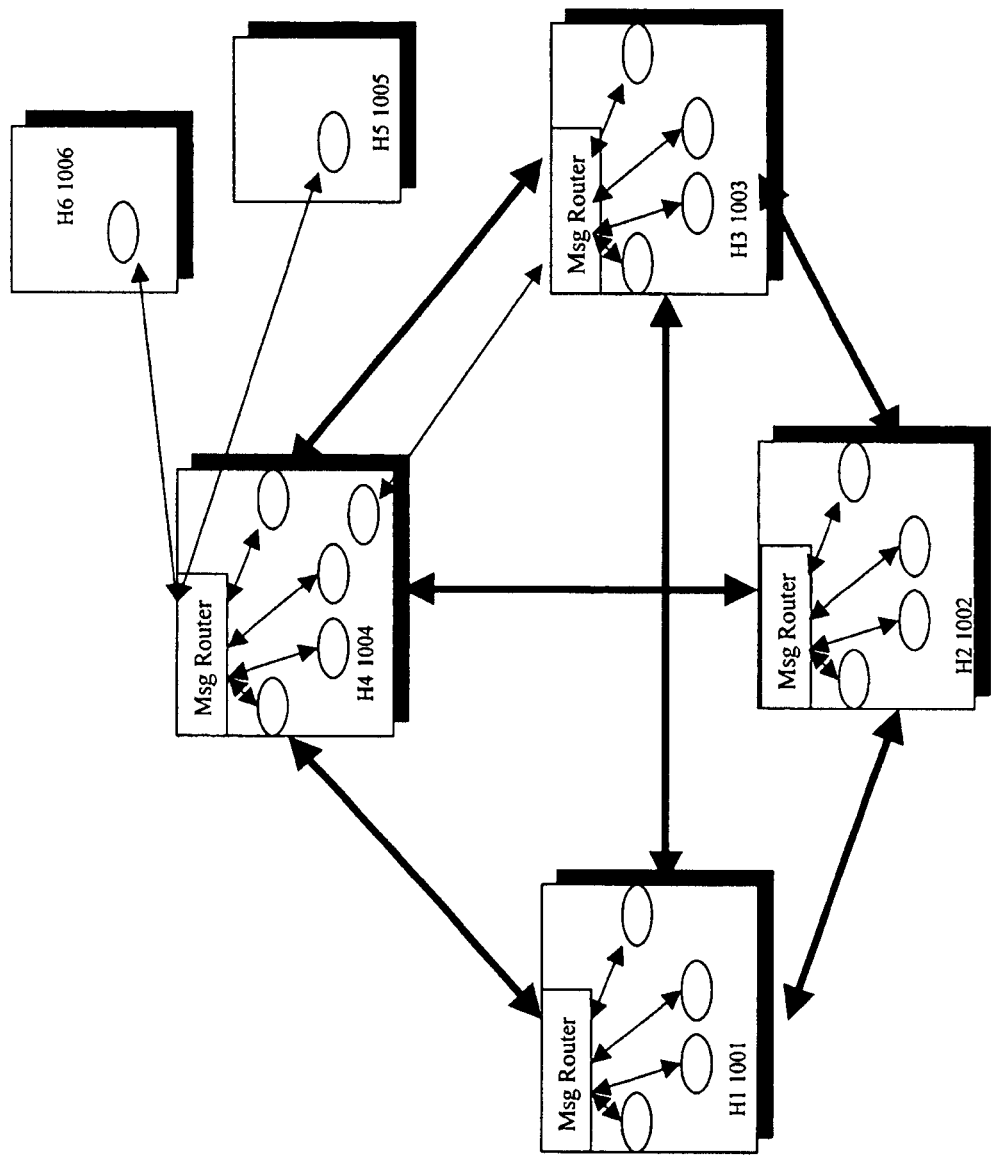
FIG. 9 is a simplified representational diagram showing one use of the present invention in a multiple-host environment.

FIGS. 8 and 9 describe how the agent framework of the present invention may be used in single host and multiple host environments, respectively. Turning first to FIG. 8, agent framework is implemented in a single host 900. The host 900 contains various types of agents, including, for example, a distributed reasoning agent (in this example a case-based reasoning agent, CBR) 901, response agent 902, email agent 903, ftp agent 904, processes agent 905, logmon agent 906, which monitors a log, logger agent 907 which creates a log, and message router agent 908 which is part of the agent framework.

In this example, the message router agent 908 is used to assist communication among agents, including the other agents in the host 900, a remote resource agent 909, and agents in other hosts connected to the host 900 via a network. Alternatively, agents in a different framework may communicate directly with each other without using an intermediary agent such as the message router agent 908 using other mechanisms such as a host-manager or facilitator to locate the agents.

In FIG. 9, the agent framework is used with multiple hosts that are connected to each other via a network. Specifically, hosts H1 (1001), H2 (1002), H3 (1003), and H4 (1004), which are connected to each other via a network, each has the agent framework installed. Further, the hosts H1 (1001), H2 (1002), H3 (1003), and H4 (1004) each has a message router, such as a JATLite message router to facilitate communication among local and remote agents, including remote agents on remote hosts H5 (1005) and H6 (1006). In other agent frameworks, such as JADE, a Message Transfer Protocol (MTP) agent performs the same functions as the JATLite message router. Those skilled in the art would know that the agent framework of the present invention may be implemented using various agent frameworks. In other words, they would recognize that the present invention is not limited by a specific agent framework.

Next, interface agents, response agents, and distributed reasoning agents of the present invention are described in more detail.

Interface Agents:

As discussed above, an interface agent may be used to monitor an output of a system or security monitoring function and to pass information from it onto a distributed reasoning agent in the form of a pre-negotiated event message. For example, an interface agent may be used to: (1) monitor and parse entries in a log file created by a system and/or add-on tool; (2) execute and parse the output of commands that can be invoked via a command-line terminal; (3) monitor and parse files produced as a result of executing a command from a command-line terminal; (4) query a database of events; and/or (5) use an extensible programmer API to allow programmers to integrate tools that do not fit the command line or log file model, but that generate events that indicate system state.

An interface agent may be used to monitor a variety of resources in a computer network. Examples of such resources include network management tools, network security tools, operating system specific features, and health tools (i.e., a disk defragmenter). Monitoring and reporting of events placed into databases is also a possibility if it is not possible to intercept the events before they are placed into the database, or if the reasoning algorithm wants to correlate existing information with historical or forensic information found in the database.

By describing outputs from various systems and security monitoring functions using a pre-defined set of message formats, the interface agents make it possible to integrate them within the present invention. In integrating a system and function, one may use ready-made (or pre-defined) interface agents or may choose to develop a custom interface agent for any given security or management tool or function so that it can interact with the present invention using the pre-defined message formats.

In integrating various security and management tools, the present invention may utilize common characteristics of such tools. For example, most security and management tools operate via command-line interfaces, produce output alerts that are put in log files, and/or contain some sort of structured outputs that can be redirected from stdout to a file. Pre-defined interface agents may be designed to monitor such log files, parse new entries, and pass them as events to a distributed reasoning agent. Alternatively, they may be designed to invoke programs at a shell command line, parse their output, and pass event elements to a distributed reasoning agent.

In implementing parsing, the present invention may take advantage of the fact that events in most system logs, program outputs and tools are well structured. As an example, Table 1 illustrates one embodiment of parsing using a log entry on an SGI machine using regular expressions. For example, a typical Linux syslog entry, "grommet Nov 17 13:03 15:00 cool-co.com emacs: (:0.0)", may have a tool interface agent definition shown in Table 1.

TABLE 1

File:
/var/log/messages
Platforms:
Linux
ParseString:
\w+\s+\d+\s+\d+:\d+:\d+\s([\w.]+)\s([\w\s.-]+)\(?.+?\)?\[?(\d*)\]?\:?[\s]+(.+)
SplitString:
[;\s'|@:=\(\)\[\]]+
Fields:
Host, Process, PID, Description
OutputOrder:
1, 3, 2, 4

The example in Table 1 parses the line into entries for Host, Process, PID, Description, etc, using a regular expression language (available and documented as part of the Unix operating system, and implemented in several publicly available programming libraries). It then reorders the contents into an event structure message for processing by a distributed reasoning agent. In this example, the tty entry is placed ahead of the program entry. The use of regular expressions to parse and tokenize the string is just one mechanism that could be used. Those of ordinary skill in the art will appreciate that there are a variety of parsing format extensions that can be used to extract common date, time, and other items in log files. They will also appreciate that similar entries can be made for other machine variants to normalize event reporting and account for any format differences, and that the normalization of events into a uniform format make the overall system of the invention easier to configure and manage.

In addition to being able to monitor resources, detect and pass events to the reasoning agents as they occur, it is also possible for many of the reasoning agents to process and replay past events also found within the monitored resource. An example is that it would be possible to replay past events found in a log file monitored by a FileMonitor agent. Replay of past events can be requested by a remote agent (normally a reasoning agent) using a predefine message. To be able to distinguish between live events and historical events, a field within the event messages indicates whether the event is current or not. The ability to access historical data, enables both forensic analysis, as well a remote drill-down to obtain more details about information that may have only been sent in summary form.

Figure 5:
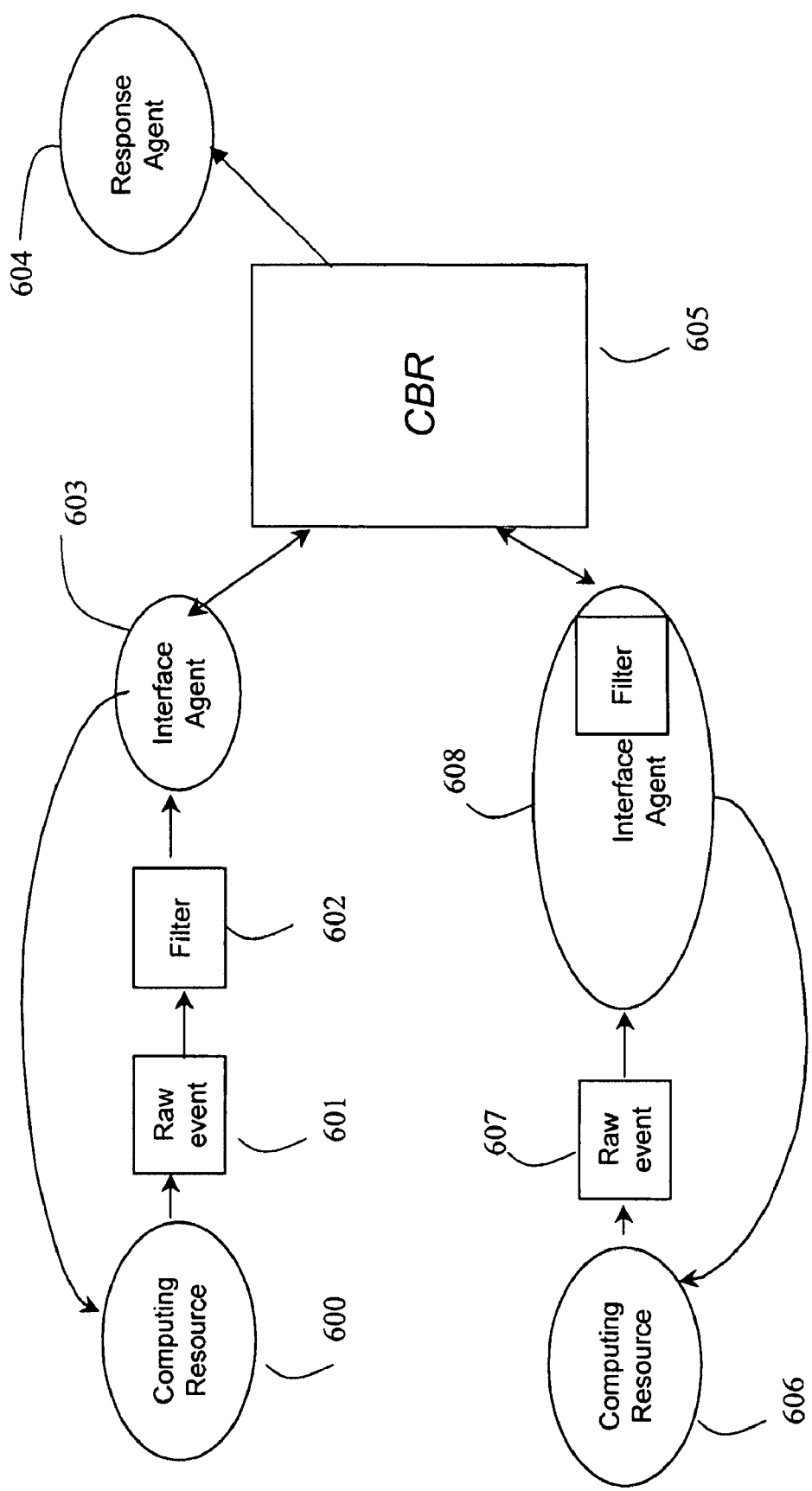
FIG. 5 is a block diagram showing one exemplary interaction among interface agents, a distributed reasoning, and a response agent of the present invention.

FIG. 5 is a logical block diagram showing one example in which interface agents are used to integrate a multiple tools and resources. In FIG. 5, a computing resource 600 produces an output describing a raw event 601, which is then processed by a filter 602. An interface agent 603, upon receiving information from the filter 602, forwards it to a distributed reasoning agent 605 for processing. The interface agent 603 also sends information to the computing resource 600.

The distributed reasoning agent 605 also receives information regarding a computing resource 606 from an interface agent 608. Like the computing resource 600, the computing resource 606 produces raw event data 607. The interface agent 608 has a filtering capability within it to prepare the raw event data 607 for processing by the distributed reasoning agent 605. The interface agent 608 exchanges information with the distributed reasoning agent 605.

The distributed reasoning agent 605, upon receiving information from one or more interface agents connected to it, processes the information and sends a directive to a response agent 604, when appropriate. It can also communicate directly with the information-gathering agent 608 and request additional information.

Response Agents

As discussed above, a response agent may be used to implement a response directive issued by a distributed reasoning agent. Appendix I lists exemplary primitive response functions that may be performed by a response agent. Those skilled in the art would know that the present invention is not limited by response functions that it implements. Response agents may perform some of the functions listed in Appendix I, different functions, and/or additional functions.

Response agents may collaborate or coordinate primitive response functions. Response agents may enlist other agents when necessary and propagate situation information to other systems or devices. For example, a response agent may perform compound actions and trace a suspicious user back to his origin in an Intranet or disable a specific network service that was exploited. This configuration of network service can be accomplished, for example, by reconfiguring TCP wrappers locally on a machine, reconfiguring a firewall, or reconfiguring an agent enabled router. Reasoning agents determine which of the response options is the most appropriate, given the situation, and the functional abstraction provided by the response agents means that only a single message directive can be used irrespective of whether the blocking option is local or remote.

Some response agents are required to maintain some system state. Because the invention represents a distributed set of components running asynchronously, it is possible that directives from multiple reasoning agents may duplicate each other, or even in some cases contradict each other temporally. By maintaining state, response agents can often resolve the conflict, or request additional context from a reasoning agent. Response agents may check appropriate system status information to confirm that all necessary preconditions have been met and there are no conflicts present that might make an action invalid and/or that might conflict with some other activities of the system.

Distributed Reasoning Agents

It is clear to anyone skilled in the art, that there are a number of different reasoning technologies that can be implemented in the distributed reasoning agents. This includes procedural reasoning, rule-based systems, case-based reasoning, Bayesian networks, and others. A characteristic of the invention is that the reasoning agents are coupled together via the messaging infrastructure so that they can share knowledge in a seamless way.

One type of distributed reasoning agent of the present invention uses a form of case-based reasoning or CBR to find an appropriate response to an event reported by an interface agent. Our version of this reasoning agent implements several new embodiments that make it better suited to the environment provided by the invention. In CBR, a problem is compared to prior cases in a case-base in order to draw conclusions about the problem and to guide making decisions. In CBR, each case in a case-base is paired with an associated response. When a case in the case-base matches a current problem, an associated response stored in the matching case is implemented. A matching case is determined by comparing values in the case structure of a case to be matched and corresponding event values for the current problem. Typically, a matching case is a case whose values are closest to those of the current situation (where the situation is represented by the events processed by the reasoning agent). The case-based reasoner may provide procedures to resolve multiple matches so that one response can be selected for the problem.

In the present invention, a CBR agent can be used to find an appropriate response in real-time based on information regarding similar situations that occurred in the past. Specifically, upon encountering an event, CBR may be used to match the current event to similar past events stored as cases in a case-base. Preferably, these cases represent previously encountered situations in which a successful response was implemented, or they represent steps in a sequence of events that might represent a more complex situation. Using information contained in cases for similar past events, CBR arrives at an appropriate response for the current event. Such response may be to implement a response associated with the closest past event or to adapt one or more past responses to the current event by using arguments from the current event and/or current system state.

A case-based reasoning agent contains case-bases. A case-base contains cases, which represent known situations that may require response, or situations that are intermediate parts of a pattern of activity. A case structure of a case represents all the relevant variables associated with making a decision for a particular problem. FIG. 7 shows one exemplary case structure, which uses entries found in a SYSLOG file to detect an event in which someone other than the root tries to use a UNIX "su" command during a certain time period (in this case, in the EVENING).

The present invention may use one or more case-bases. For example, a case-base may be defined to monitor events from a tool or a group of tools that share similar characteristics. One case-base may be used by one or more tools in the group as long as the events produced by each tool have the same structure, but for those tools with different characteristics, a different case-base may be used.

Figure 6:
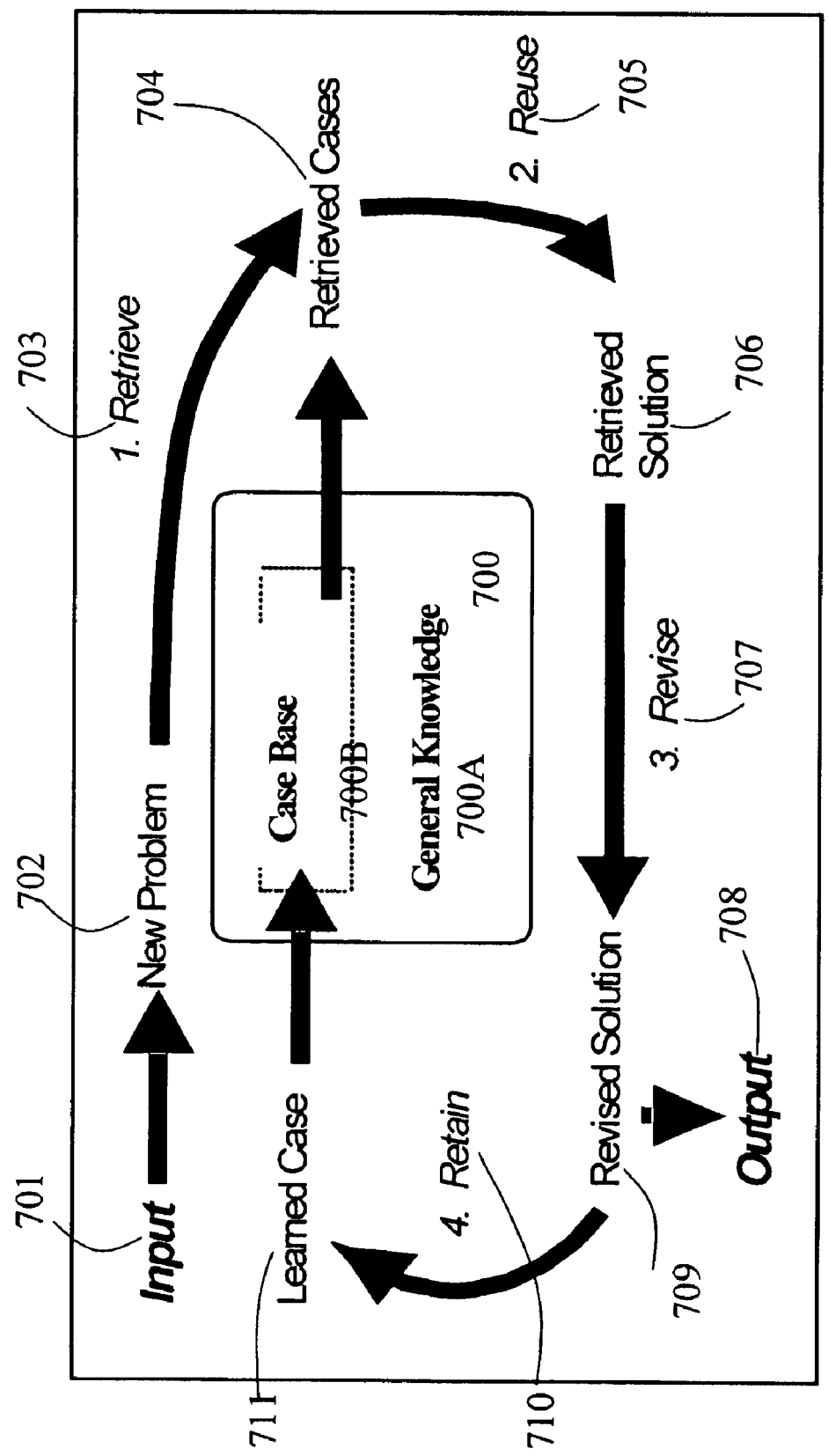
FIG. 6 is a block diagram illustrating one case-based reasoning scenario of a distributed CBR agent of the present invention.

FIG. 6 illustrates one basic flow of a CBR system of the present invention. In FIG. 6, a CBR system accesses a knowledge base 700, which contains a case-base 700B and general knowledge 700A. The knowledge base 700 is used to draw conclusions about a new problem 702. Specifically, the new problem 702 is defined based on a new input 701. The CBR system then accesses the knowledge base 700 to retrieve 703 cases. Retrieved cases 704 are compared with the new problem 702. A matching case may be chosen from the retrieved cases 704. A retrieved solution 706 typically is the solution associated with a matching case and is reused 705 to arrive at a solution for the new problem 702. The retrieved solution 706 may be revised 707 to arrive at a revised solution 709. The revised solution 709 then becomes an output 708 of the CBR system. Further, the revised solution 709 may be retained 710 as a learned case 711 and stored in the case-base 700B.

Several characteristics of a problem domain for the present invention make the use of CBR suitable. These characteristics include recurrence of problems, reusability of a solution for a particular problem, and the fact that a problem may be described in a structured manner.

In the present invention, a traditional CBR system is modified to make it even more suitable to network management and/or security tasks. Such modifications are now described in detail.

A CBR system of the present invention may differ from an existing CBR system in a sense that its CBR matching process is pushed to a much lower level. In other more centralized management systems, a single CBR is normally used, and remote events are brought to it. Specifically in the present invention, a CBR agent may be assigned to monitor all resources for example on a host, where a CBR agent may have multiple CBR processes running in it, each process with it's own case-base. One CBR process of the present invention may match entries in system log files, another may match user account activity, and another different distributed CBR agent CBR process may match network access. A CBR agent running the same, or different processes will also be running on other hosts in the computer network. In other words, the present invention uses multiple CBR agents and such CBR agents may be distributed throughout the network. The actual selection of how many resources a CBR agent will monitor will be network and host dependent, but the invention allows the user of the invention to configure whether event streams are processed by local or remote CBR's depending on how many computing or network resources are available.

The fact that a large number of the security events that must be examined represent normal activity and require no response means that the use of a single centralized processing and reasoning mechanism is particularly inefficient. Processing of events locally where they occur, being able to take immediate action, and then, an ability to pass only summary information of potentially relevant activity is often much more efficient in terms of network bandwidth utilization.

In the present invention, distributed CBR agents may run on every host in a network. By distributing CBR agents throughout a network, the present invention enables local decision-making based on local resources. Distributed CBR agents may also be assigned to one or more resources in the network. They may monitor information from a single system resource or information that summarizes multiple resources. When outputs from several resources are fed to a distributed CBR agent, it enables the distributed CBR agent to identify event patterns that may only be identifiable by combining outputs from several resources. This however, is only one of the ways patterns over multiple resources can be recognized in the present invention.

Traditional CBR mechanisms focus on the recognition of important events. A characteristic of the computer management and security domain is that many tools report events with a fairly high false alarm rate. Additionally it is often compound sequences of events that must be recognized to be able to recognize situations that require response. To address this, the CBR reasoning agent has been enhanced with capabilities that allow it to recognize such compound activity. An ability to chain (follow a connection) between events, recognize events that occur with some specific pattern or frequency is now possible by allowing the cases to include matches to the CBR working memory to follow from one event to another. It is even possible to implement simple state machines such as the one illustrated in FIG. 4. Because the CBR agent working memory is potentially visible to multiple CBR processes within the agent, it is possible to correlate and detect patterns of events, even when the events come from multiple event streams.

Distributed CBR agents of the present invention, as well as other reasoning agents, may share knowledge at different levels. Distributed CBR agents may share knowledge by sharing case-bases. Alternatively, they may share knowledge through CBR knowledge objects, which can represent information about values, counts, and/or properties. Knowledge objects in the CBR provide a way for a CBR to represent and share knowledge across case-bases, and even across multiple CBR agents. For example, knowledge objects in a CBR may be made to be visible to all distributed CBR agents, or perhaps just a subset of them.

To ease programming and configuration of the agents in the present invention, they can be grouped together to form collections of agents, case-bases, cases or case-templates on hosts that all perform similar functions. This enables the system of the present invention to scale to hundreds or thousands of hosts, without having to configure each one individually. This also means it is possible to specify case-bases that will be present in all CBR agents within a certain group of hosts, as well as to specify certain cases that are only found within a subset of those case-bases. Knowledge objects can set to be local only to case, to be visible across all cases in a CBR case-base, be visible across all case-bases in a CBR, or even across multiple CBR agents that are members of a group. The scope of visibility of a knowledge object is specified at the time it is created. Once the scope of visibility of an knowledge object has been specified, if the visibility of the object is to members of a group, messaging within the underlying agent framework is used to keep the item up to date and consistent across all of the reasoning agents within the group. A feature of the invention is that the process of maintaining and keeping the knowledge objects synchronized is transparent to the user of the invention, and is not something they need to be concerned with other than knowing that it is being done.

When using CBR in the present invention, one may choose to designate a centralized reasoning node, and send remote events to it. If such nodes are designated, local functions may be used to deal with a decision node failure, or alternatively remote functions can take the place of a local decision node if it fails by redirecting events to another location, and transferring the reasoning function. For example, local functions may take over the operation of a centralized decision node until it comes back up, until the system is dynamically reconfigured, or until another node is designated to take place of the failed decision node.

Additionally, the ability to implement distributed algorithms with the present invention provides additional fault tolerance capabilities. If a single host or component becomes unavailable if the host is only one of several hosts implementing an algorithm that processes distributed events, then only that part of the system becomes unavailable. The rest of the system remains functional. Further, within the agent-framework additional fault tolerance features can be utilized (or implemented, if they are not natively part of the agent-framework). Such fault tolerance features can include guaranteed message delivery. Using persistent buffering, it is possible to ensure that messages are cached with unique ID's as they are processed by the message-routers, and are not removed from the caches until recipients confirm that the messages have been received. Careful design and implementation of the agent framework can ensure both delivery and control of many event message ordering problems that might otherwise have to be programmed explicitly into agents. This means that if components fail, they do not necessarily lose important vital information that occurred while they were off-line, once they are restarted.

A case-base of the present invention may be defined to take advantage of the structured format of system information, such as system log files, command output, and management information bases. A case-base may be defined for each resource monitored. Knowledge objects with the CBR (and also across multiple CBR's) can be visible across multiple case-bases, making it possible to correlate activity across multiple event streams.

The present invention allows a user to dynamically modify various aspects of a CBR process. For example, a user may modify a case-base by adding new cases. Additionally the case-base may be modified automatically as part of the response actions of some other case that react to events. In so doing, a user may use case adaptation functions, such as those listed in Appendix I. One way in which to view the cases within the case-bases is that they implement and enforce management and security policies within network. Providing an ability to automatically adapt the cases allows the system to automatically enable and disable one or more cases, which can allow the system to dynamically shift policies if warranted.

Another preferred embodiment of the present invention supports case templates, which can be used by a user to dynamically add new cases and/or represent a specific situation. Cases derived from case templates may exist for only a specific period of time. As described below, a user may use case templates to manage the behavior of the distributed CBR agents of the present invention.

Case templates may be used to represent situations that may be important some time in the future. For example, to deal with a likely situation where a computing system is repeatedly scanned from a specific remote location in the evening, a case may be created from a case template that represents such situations, and associate information from the current situation (in this example situation the remote location doing the scanning) with a response that will be specific only to that location if it continues to scan.

A user of the invention may also use case templates to dynamically and automatically add new cases to a case-base. This allows CBR matching process of the present invention to evolve in a way that performs extra work, such as turning on additional auditing, for example, that would directed only at specific problems, rather than having to direct extra work across every resource, as is currently done with previous tools.

Case templates may also be used to analyze historical events or to look for future events. Many network activities involve some sequence of events, but an event that is part of a sequence is not always detected during the sequence. Once a suspicious event has been detected, case templates may be used to review historical data stored in log files to find other events that might be related to it and be part a larger pattern. By analyzing historical data, one is more likely to obtain vital information about the nature of the detected event. By allowing log files to be replayed through the current instantiation of matching functions in CBR, one may be able to detect events that were originally missed. It also allows the collection of all information relevant to some specific event to be presented as a single journal.

A characteristic of CBR (and other reasoning mechanisms, such as rule-based systems), is that often more than one case may match a situation. When this occurs there is normally a way in which to resolve "ties" and select which case (or rule) to use. In most previous systems, only a single case or rule is selected. This is done normally using a first-match, or closest match approach. Because CBR allows inexact matching of events to cases, a matching score can be used. The matching mechanism can be heuristic or probabilistic, and produce a ranked list of the matching cases (or rules). The present invention extends this capability by making it possible for the user of the invention to layer responses in a way that matches their environment. In situations where cases represent situations that are more specific than other cases, it is possible for the user of the invention to use this capability to have the ranked cases either build upon each other: by having a case implement it's response, and then invoke the response of the next ranked case in the list of matching cases, or completely supersede the lower ranked cases by not invoking the responses of lower ranking cases. As an added feature, it is also possible to use the 'always-fire' switch in a case to ensure that the response to a case is always implemented, every time it matches, irrespective of where it is ranked in the list of matching cases.

For example, multiple cases may match a problem of pilfering and/or accessing an/etc/passwd file. This problem may also match a more generic case that represents any unauthorized access to any file in the/etc directory. This generic case may invoke a particular type of response, such as increasing monitoring of user activities related to accessing files in the/etc directory. The problem may also match a case that specifically represents pilfering and/or accessing of an/etc/passwd file that contains information regarding user accounts. This case may contain a more specific response than the generic case-such as checking the/etc/passwd file to see whether any new accounts are added or whether the file contains weak passwords that can be easily guessed. Using the present invention, the user may configure to implement responses of both cases or implement a response of one of the two cases.

Using a precedence based invocation feature similar to those found in object oriented languages, a user may explicitly control what responses are implemented when there are multiple matching cases. An embodiment of the present invention is that we also allow the case-developer to specify a ranking precedence for cases that are expected to match in the same situation. Further, these precedence rankings can be combined with switches within the cases. The switches determine whether one, some or all of the matching cases are used to produce a response. There are a number of ways in which the user of the invention can specify such rankings, and as shown in FIG. 7, the current implementation includes both a specificity and priority value.

Other conflict resolution mechanisms include response function call-switches. Such call-switches may indicate, for example, whether a case is active, always fired, or subject to time-out, as shown in FIG. 7. In addition, a switch may indicate that a case is to fire a next case, as indicated in the call-next switch in FIG. 7. An active switch allows a user to turn a case on or off. When an always-fire switch is marked, a corresponding response is implemented irrespective of a precedence value assigned to the case. A time-out switch may be used to define a time period during which a case remains active. For example, when a template is instantiated, a time-out switch may be used to keep a case associated with the template only for a certain period of time. Finally, a call-next switch may be used to layer responses to an event. For example, if the call-next switch of a case with the highest precedence value is on, a next case, i.e., the case with the second highest precedence value, is fired after that case. A case with the third highest precedence value is fired, if the call-next switch of the case with the second highest precedence value is on. In sum, using a precedence-order, call-switch, or both, a user may flexibly select one or more responses to an event.

Another configuration capability within the CBR agent is an ability to control the activation of cases based on the time of day, specific day of the week, holiday, etc. This allows the management policies implemented by the invention to vary depending on the time or day.

As discussed above, each case is associated with some response. Examples of a response include invoking agents that perform one or more direct actions using arguments from the current situation and invoking case-based adaptation commands such as those listed in Appendix I. By invoking case adaptation commands, one may dynamically add new cases that are specific to the current problem to the CBR system.

Knowledge objects, cases, and templates of the present invention may be flexibly modified. Specifically, the CBR knowledge objects, cases, and templates may be modified as part of a case response, locally within a single CBR, remotely to another CBR, or across a group of CBRs.

One skilled in the art will appreciate that by properly utilizing one or more features of the present invention, one can implement a variety of system alert levels that can dynamically alter the way a system responds to events. These features include a precedence order, case templates, and a feature that allows one to dynamically activate and deactivate cases already in a case-base.

By using the CBR knowledge objects as well the case templates, it is possible to implement a number of complex correlation algorithms within the CBR's. This is a feature not normally part of traditional CBR implementations, and is specific to the CBR agent of the invention. Additionally, in the same manner as was described for the CBR knowledge objects, the case templates can be installed in different case-bases within the same CBR agent, as well as in other CBR agents that are part of a group that is specified at the time the case-template gets converted into a case. The underlying mechanism that makes this distributed visibility of case-templates (and also the knowledge objects) is transparent to the user of the invention and is accomplished by message passing programmed into the reasoning agents.

It will be apparent to those skilled in the art that various modifications and variations can be made in the present invention without departing from the spirit or scope of the invention. Thus, it is intended that the present invention covers the modifications and variations of this invention, provided that they come within the scope of any claims and their equivalents.

Other types of reasoning agents are also worthwhile, and the same matching capability could be implemented using (for example) a modified rule-based system such as JESS, or CLIPS. The reasoning mechanism of the invention can be augmented to include other techniques such as Bayesian networks, etc. Within the spirit and scope of the invention one would consider that a reasoning agent implementing any of these reasoning mechanism that had the same capabilities of sharing knowledge, dynamically adapting the knowledge-bases and knowledge objects using the methods described herein is within the claims of the invention.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

APPENDIX I

Examples of Primitive Responses

:exec—Executes a local or remote shell command or script with the appropriate arguments filled in.
:mail—Sends mail to a list of recipients that are specified as arguments. The content of the mail is based on a message template that is identified as an argument.
:alert—Used to send an on-line notification to one or more users, with arguments that indicate the content of the notification. The alert agent can be used for both notification as well as user-feedback interaction that can then be used as guidance for the response.
:kill-process—Can kill or stop the specified process.
:disable-account—A specified user account is disabled
:enable-account—A specified user account can be re-enabled after it has been disabled
:disable-service—Stops of turns off a specific network service running on a host. The host blocked is specified as an argument.
:enable-service—Turns on a specific network service running on a host.
:disable-host—Can block all traffic from a specific host. The system blocked is specified as an argument, and the blocking actuation can be local to the host, or remote from it using a network router, switch or perhaps a firewall
:enable-host—Can block all traffic from a specific host.

Examples of Responses that affect Working Memory Knowledge Objects

:add-knowledge—sets a CBR system flag locally or remotely, possibly for a specific amount of time
:remove-knowledge—removes a CBR system flag locally or remotely
:increment-count—increments a numerical count value of a knowledge object locally or remotely, possibly for a specific amount of time, after which it is automatically decremented
:decrement-count—decrements a numerical count value locally or remotely (not lower than 0)
:add-property—adds a new knowledge-object property list value locally or remotely to a CBR flag
:delete-property—removes a knowledge-object property locally or remotely

Examples of Response Actions that Dynamically Alter the Knowledge-Base

:template-add—converts a template to a case in a local or remote CBR
:activate-case—ensures that the specified case is made active in the CBR
:deactivate-case—makes the specified case in the CBR inactive
:delete-case—removes the specified case from the specified case-base in a local or remote CBR
:send-message—generates and sends a message to a specified recipient agent within the system of the invention
:send-query—This is very similar to "send-message" except that it also includes a place where you can tell the recipient to respond to another agent and to put a conversation ID in the message so that responses to this query can be uniquely identified.
:set-timer—allows the CBR programmer to implement a response (one of the other response items) that will occur after some delayed amount of time
:check-case—Because the CBR is event driven, allows the response of one case to be used to alter conditions (usually by CBR flags) in which other cases in the same or a different case-base might fire, and then to check those conditions and, if appropriate, fire the case.

What is claimed is:

1. An agent-based distributed reasoning system for resolving an event on a computer network having components comprising a plurality of hosts, the system comprising:
    a plurality of interface agents running on the plurality of hosts, each of the plurality of interface agents running on an assigned component and monitoring a respective resource thereon;
    a plurality of distributed reasoning agents running on the plurality of hosts, each of the plurality of distributed reasoning agents having both at least one respective knowledge base of situations and a respective working memory, and wherein each of the distributed reasoning agents is capable of synchronizing its knowledge base and working memory with the knowledge bases and working memories of other reasoning agents in at least one subset of less than all the reasoning agents in the plurality thereof; and
    a plurality of response agents running on the plurality of hosts;
    wherein an interface agent in the plurality thereof formats and reports an event occurring in its assigned resource to one of the distributed reasoning agents to which the interface agent is connected;
    wherein the distributed reasoning agent receiving the report of the event:
        accesses the at least one respective knowledge base and selects a response therefrom;
        synchronizes all the knowledge bases and working memories associated with the reasoning agents in the at least one subset and thereby enables recognition of compound sequences, patterns and chains of events across the plurality of resources; and communicates the response to one of a plurality of response agents running on the plurality of hosts to resolve the event.

2. The system of claim 1, wherein the resources within the computer network comprise network management tools, network security tools, system security tools, operating system specific features, and system health tools.

3. The system of claim 1, wherein the response agent receiving the response resolves the response against another response received from at least one other distributed reasoning agent of the plurality thereof to resolve the event.

4. The system of claim 1, wherein the response includes invoking one or more situations in the at least one knowledge base.

5. The system of claim 1, wherein the reasoning agents in the subset utilize their knowledge bases and working memories to implement parallel and distributed reasoning programs, allowing situation matching to occur locally using the synchronized knowledge bases and working memories even if other situation related events are not reported by the interface agent to the reasoning agent to which it is connected.

6. The system of claim 1, wherein the distributed reasoning agent receiving the report selects a response when multiple situations in the respective knowledge base match the event.

7. The system of claim 1, wherein the situations comprise at least one situation template.

8. A method for responding to an event on a computer network comprising a plurality of hosts, the network having an agent-based framework with a plurality of agents comprising at least one interface agent connected to at least one of a second plurality of distributed reasoning agents, and a third plurality of response agents; the method comprising:

monitoring, by means of the at least one interface agent, a resource in the computer network for the event;

formatting and reporting, by means of the interface agent, the event in the resource to a connected one of the distributed reasoning agents;

querying, by means of the connected one of the reasoning agents, at least one other of the plurality of agents, receiving information related to the event therefrom, and thereafter selecting a response to the event using the connected one of the distributed reasoning agents; and implementing the response to the event using a selected response agent.

9. The method of claim 8, wherein the connected one of the reasoning agents and another of the first plurality of reasoning agents can query each other to determine a state of the network.

10. The method of claim 8, wherein the connected one of the reasoning agents and another reasoning agent utilize respective knowledge bases and working memories to implement parallel and distributed reasoning programs, allowing situation matching to occur locally even if other situation related events occur elsewhere.

11. The method of claim 8, wherein the selected response agent collaborates with other response agents in the third plurality thereof to resolve the event.

12. The method of claim 8, further comprising a step of adding a new situation to a knowledge base of the connected one of the distributed reasoning agents using a situation template.

13. The method of claim 8, wherein the method detects situations represented by sequences and patterns of events that are recognized by modifying working memory, by adding situation templates, and by representing any event pattern that can be represented by a state-machine.

14. The method of claim 8, further comprising a step of analyzing historical data using a new situation created from a situation template.

15. A system for managing a computer network, the computer network comprising a plurality of hosts, the computer network having an agent-based framework with a plurality of agents comprising at least one interface agent connected to at least one of a second plurality of distributed reasoning agents, and at least a third plurality of response agents, wherein:

the at least one interface agent formats and reports an event in an assigned resource to the at least one distributed reasoning agent to which it is connected;

the at least one distributed reasoning agent receiving the report communicates information concerning the event to at least one other of the plurality of distributed reasoning agents, whereafter the at least one other distributed reasoning agent selects a response; and communicates the response to one or more of the response agents to resolve the event.

16. The system of claim 15, wherein two or more of the response agents coordinate response information to resolve the event.

17. A computer program product for managing a computer network comprising a plurality of hosts, the computer network having an agent-based framework with a plurality of agents, at least one of which is an interface agent, at least a second plurality of which are distributed reasoning agents, and at least another of which is a response agent, the computer program product comprising:

computer readable program code configured to monitor a resource in the computer network using the interface agent;

computer readable program code configured to format and report, using the interface agent, an event in the resource to a distributed reasoning agent to which it is connected;

computer readable program code configured to select a response using the connected distributed reasoning agent by accessing at least one knowledge base associated with the connected reasoning agent and by thereafter synchronizing knowledge bases and working memories associated with other distributed reasoning agents in a subset of the plurality thereof, the subset consisting of less than all the reasoning agents in the plurality thereof, and utilize the synchronized knowledge bases and working memories to enable recognition of compound sequences, patterns and chains of events across the plurality of hosts;

computer readable program code configured to implement the response using the response agent;

and a computer readable medium in which the computer readable program codes are embodied.

* * * * *